May 19, 1931. J. S. STULL 1,806,131
APPARATUS FOR HANDLING ARTICLES
Filed Sept. 17, 1929
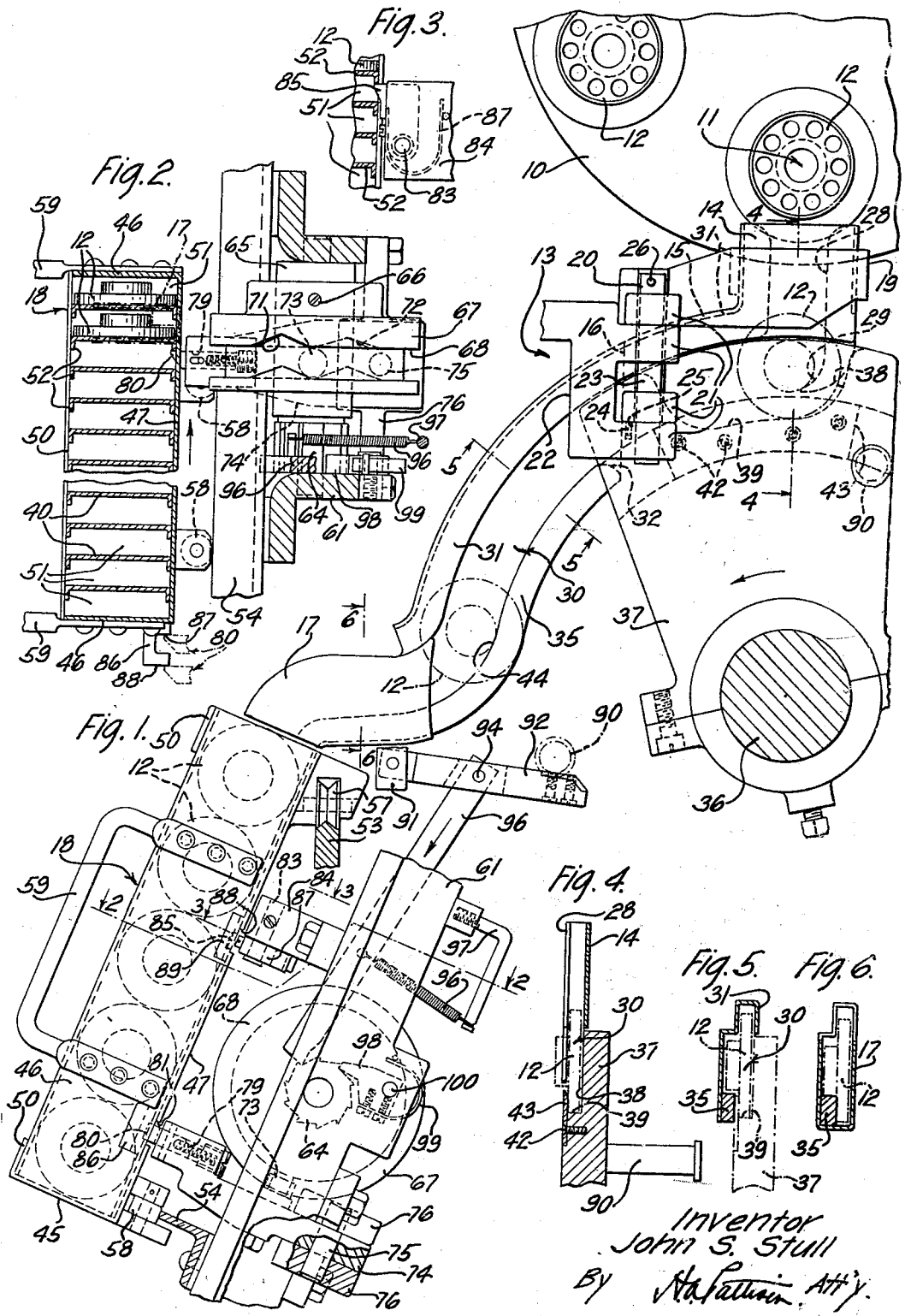
Inventor
John S. Stull
By [signature] Att'y.

Patented May 19, 1931

1,806,131

UNITED STATES PATENT OFFICE

JOHN S. STULL, OF CHICAGO, ILLINOIS, ASSIGNOR TO WESTERN ELECTRIC COMPANY, INCORPORATED, OF NEW YORK, N. Y., A CORPORATION OF NEW YORK

APPARATUS FOR HANDLING ARTICLES

Application filed September 17, 1929. Serial No. 393,154.

This invention relates to apparatus for handling articles, and more particularly to article handling and assembling attachments for automatic machines designed to produce articles.

The primary object of this invention is to provide an apparatus for expeditiously assembling articles in a predetermined order without deleterious effect thereon as delivered from a machine.

In accordance with one embodiment of this invention as applied to multiple spindle automatic screw machines, the completed articles as predeterminedly released from the machine are received in an arcuate chute cooperating with which is a continuously rotating member operable in timed relation with the release of the article from the machine and provided with a pocket in its periphery for receiving the article from the receiving end of the chute. Each article is individually transferred from the receiving end of the chute and released into the discharge end thereof by the member during each rotation thereof, the article being directed into a compartment of a multiple compartment receptacle. During each rotation of the member it actuates a pawl and ratchet mechanism and after a predetermined number of actuations thereof corresponding to a predetermined number of articles to be assembled in each compartment a cam controlled by the ratchet actuates a pawl operatively associated with the receptacle and indexes it to present an empty compartment for the reception of a similar number of articles.

Other objects and advantages of this invention will more fully appear from the following detailed description taken in connection with the accompanying drawings, wherein Fig. 1 is a fragmentary elevation, partly in section, of an apparatus embodying the features of this invention;

Figs. 2 and 3 are fragmentary plan sections taken on the lines 2—2 and 3—3, respectively, of Fig. 1, and Figs. 4, 5, and 6 are fragmentary vertical sections taken on the lines 4—4, 5—5, and 6—6, respectively, of Fig. 1.

Referring now to the drawings in detail wherein similar reference numerals indicate like parts throughout the several views, 10 indicates, fragmentarily, a multiple spindle work carrier or head of an automatic screw machine of known type which is rotatably indexed at predetermined intervals to a station 11, at which point suitable mechanism (not shown) severs a completed article 12 from the stock carried in the spindles of the head 10. The particular article 12 being handled in the embodiment of this invention comprises, as clearly shown in Figs. 1 and 2, a telephone transmitter electrode in the form of a disk with an outer peripheral flange and an apertured hub-like portion extending outwardly at one side thereof having a diameter greatly less than the flanged portion.

Below the station 11 and in line to receive the completed articles 12 as they fall after being severed from the stock mounted in the successively indexed spindles carried in the head 10 is an arcuate chute 13 having a vertically disposed end portion 14 and a short arcuate portion 15 extending towards the left to the point 16, where it is aligned with the main arcuate portion of the chute for receiving the article. The chute 13 is provided with an opposite end portion 17 arranged below and to the left of the portion 14, as viewed in Fig. 1, through which articles are discharged into a receptacle 18.

Suitable means is provided for supporting the chute 13 in predetermined relation with the automatic screw machine, but for the sake of clearness has been omitted from the drawings. The receiving end 14 of the chute 13 is fixed to a bracket 19 hinged by means of a pin 20 passing through cooperating eye lugs 21 formed upon the bracket 19 and a stationary bracket 22, the pin being secured to the eye lugs 21 of the bracket 19, but are free to slide in the eye lugs 21 of the bracket 22. The lower surfaces of the eye lugs of the bracket 19 normally rest on the upper surfaces of the cooperating eye lugs of the bracket 22 with a space 23 between the lower surface of the upper eye lug of the bracket 22 and the upper surface of the lower eye lug of the bracket 19, in which position a pin 24 carried by the lower eye lug 21 of the bracket 19 extends into an aperture 25 provided in the adjacent eye lug of the bracket 22, thereby locking the hinged article receiving end 14 of the chute 13 in an operative position. When it is necessary to swing the hinged end 14 of the chute 13 away from the work carrier or head 10 during adjustments or alterations thereon a handle in the form of a forwardly extending pin 26 secured to the hinge pin 20 above the uppermost eye lug 21 is grasped by the operator and by moving upwardly thereon the bracket 19 carrying the receiving end 14 of the chute 13 may be elevated a distance corresponding to the space 23 between the eye lugs 21. This movement withdraws the locking pin 24 from the aperture 25 and permits the receiving end 14 to be swung forwardly about its pivot away from the work carrier or head 10, the chute portion 14 separating from the main portion of the chute 13 at the point 16.

A vertically disposed slot 28 indicated in dotted outline in Fig. 1 is formed in the rear wall of the receiving end 14 of the chute 13 for the passage of the laterally extending hub-like portion of the article 12, the flanged portion of the article being guided by the end and side walls of the chute end 14. One side of the rear wall having the slot 28 is formed at the lower end of the slot with a curved portion 29 so that when the article falls into the receiving end 14 of the chute it will be deflected toward the left in line with its passage to the discharge end 17, as indicated in dotted outline in Fig. 1. The chute 13 for the greater portion of its length, as clearly shown in Figs. 1, 4, and 5, is open upon its forward and lower sides, as indicated at 30, with the exception of a comparatively narrow forward wall strip 31, as shown in Fig. 5, which forms a continuous narrow depending forward wall between its receiving and discharge ends, the discharge end 17 being open along its top (Figs. 1 and 6), the purpose of which will be described hereinafter. Also beginning at the extreme lowermost portion of the discharge end 17 of the chute 13 and terminating at a point 32 adjacent that portion of the chute which is open upon its lower side the rear wall has fixed thereto a laterally extending rail-like member 35 upon which the periphery of the hub-like portion of the article 12 rolls as it advances along the chute.

A main continuously rotating cam shaft 36 of the automatic screw machine has fixed to rotate therewith an arm 37 having formed in its rear face, as viewed in Fig. 1, a depression or pocket 38 extending inwardly from its periphery to a surface 39 substantially in line with the lower surface of the rail-like member 35, the periphery of the arm being slightly spaced from the lower edge of the narrow forward wall strip 31 as well as from the right edge of the forward wall of the discharge end 17 of the chute. Secured to and flush with the rear face of the arm 37 by screws 42 is a plate 43 which extends above the inner or bottom surface of the pocket 38 sufficiently to bring it slightly below the upper surface of the rail-like member 35. It is to be understood that all cooperating arcuate surfaces of the chute 13 and the arm 37 are formed from a common point, the axis of the cam shaft 36.

Referring particularly to Figs. 1 and 4 it will be apparent that when the arm 37 during its counterclockwise rotation reaches the point shown in the drawings and an article 12 is severed as hereinbefore described and falls into the receiving end 14 of the chute 13 with the hub-like portion to the rear it will engage the portion 29 of the chute and be deflected toward the left and into the pocket 38 of the arm 37, the periphery of the article resting on the surface 39 of the pocket and in this position it will be held substantially upright by the opposite side walls of the receiving end 14 of the chute, the plate 43 and the forward wall of the pocket 38 as clearly shown in Fig. 4. During the continued rotation of the arm 37 the narrow depending forward wall 31 of the chute 13 serves to maintain the article 12 upright, as clearly shown in Fig. 5, as it moves from the position shown in Fig. 1. As the arm 37 continues to rotate counterclockwise the article 12 will roll to the left end of the pocket 38 and when the article carried in the pocket reaches a position as shown in dotted outline intermediate the receiving and discharge ends 14 and 17 of the chute, the article will be moved automatically from the pocket 38 of the arm 37 when the right end of the pocket 38 engages the periphery of the article by a deflecting portion 44 of the rail-like member 35 and roll therealong into the discharge end 17 and thence into the receptacle 18 by gravity.

The receptacle 18, referring particularly to Figs. 1 and 2, comprises bottom and end walls 45 and 46, respectively, a right side wall 47 extending its entire height, and left side wall portions 50 adjacent the upper and lower ends of the receptacle, the intermediate space being left open to expose the contents of the receptacle. A plurality of compartments 51 are formed in the receptacle 18 by means of fixed equally spaced channel-shaped plates 52 arranged parallel to the end walls 46 and extending from the upper to the lower ends thereof. Each compartment is of a height which is capable of receiving five of the articles 12 in stacked relation, as clearly shown in Fig. 1, the width of the compartment being substantially the diameter of the flanged portion of the article and the depth thereof the width of the article including the hub-like portion thereof. The receptacle 18 is reciprocably mounted for horizontal movement in an upright inclined position upon suitably supported upper and lower rails 53 and 54, respectively, by sets of upper and lower rolls 57 and 58, respectively, arranged adjacent each end 46 of the receptacle. Handles 59 are secured to the opposite end walls 46 of the receptacle 18 for the purpose of mounting and removing the receptacle from the rails 53 and 54, the receptacle being positioned upon the rails from the forward end thereof, as viewed in Fig. 1, with the extreme upper compartment 51, as viewed in Fig. 2, aligned with the discharge end 17 of the chute 13, which is shown in dotted outline, above the second compartment from the upper end, the first compartment having already been filled with the articles 12 and one article dropped into the second compartment, which has been automatically indexed under the discharge end 17 of the chute 13 by means to be presently described controlled by the continuously rotating arm 37.

Rotatably journaled in spaced upright angle irons 60 and 61 is a ten tooth ratchet wheel 64 which is provided with an elongated hub portion 65 substantially the diameter of the ratchet wheel portion. Adjustably secured to the hub portion 65 by a set screw 66 is a cam member 67 provided with a peripheral cam groove 68 which is formed with two identical sets of cam surfaces 71 and 72 spaced 180° apart. Riding in the cam groove 68 is a roller 73 (dotted outline Figs. 1 and 2) journaled upon a lever 74 pivoted at one end as indicated at 75 between bracket plates 76 fixed at each end to the upright angle irons 60 and 61. The opposite end of the lever 74 is formed with a depression 79 within which is reciprocably mounted a spring pressed reciprocable indexing pawl 80, the actuating end of which projects into a slot 81 (Fig. 1) formed in the right side wall 47 of the receptacle 18 and extending from the lower end as viewed in Fig. 2, or the forward end as viewed in Fig. 1, to a point adjacent the opposite end of the receptacle. Pivotally mounted directly above the pawl 80 as indicated at 83 upon a bracket 84 fixed to the angle irons 60 and 61 (Fig. 1) is a locking pawl 85 normally maintained in an actuated position by a leaf spring 87 (Fig. 3). Like the pawl 80 the pawl 85 projects into a slot 88 similarly formed in the receptacle 18 as the slot 81 for the pawl 80. Both of the pawls 80 and 85, as viewed in Figs. 2 and 3, respectively, engage upon their upper flat surfaces thereof with narrow vertical edges of the short arms of the channel plates 52 separating the compartments 51 of the receptacle 18 which function as a rack during the indexing of the receptacle, which operation will be described later. The forward end wall 46 of the receptacle 18 in line with the pawl 80 has secured thereto a U-shaped lug 86 providing additional rack surfaces 87 and 88 equivalent to the edges of the channel plates 52 which cooperate with the pawl 80 when the extreme forward compartment is being indexed into position for receiving the articles 12 in a manner to be described later. Also fixed to the forward end wall 46 of the receptacle 18 is a plate 89 serving as an additional rack surface for the locking pawl 85 when the last mentioned compartment 51 is indexed into position.

Extending forwardly from the arm 37 carried by the main cam shaft 36 of the automatic screw machine is a roller pin 90 which is positioned adjacent the right end of the arm, as viewed in Fig. 1. Pivoted at one end to a stationary bracket 91 is a lever 92, the opposite or free end of which extends into the path of the roller pin 90. The lever 92 intermediate its ends has pivoted thereto, as indicated at 94, an actuating pawl 95, the opposite end of which engages the teeth of the ratchet wheel 64. A tension spring 96 having opposite ends connected to the pawl 95 and stationary bracket 97 maintains the pawl in operative engagement with the ratchet wheel at all times. A pawl 98 held in engagement with the teeth of the ratchet wheel 64 by means of a leaf spring 99 serves to maintain the ratchet wheel 64 in its indexed position after an actuation by the pawl 95 in a well known manner, the pawl 98 being pivoted as indicated at 100 (Fig. 1) to the angle iron 61.

In the operation of the article handling and stacking apparatus herein described it is to be understood that the completed articles 12 are severed at the station 11 of the work carrier or head 10 at predetermined intervals and in timed relation therewith the arm 37 continuously rotating in a counterclockwise direction, as indicated by the arrow (Fig. 1), will arrive with the pocket 38 thereof substantially at the position shown in Fig. 1 to receive the completed article as it is severed from the stock carried in the spindle of the head 10, an article 12 being received in the pocket during each revolution of the arm 37. As hereinbefore described the articles 12 are successively transferred by the cooperating chute 13 and the arm 37 to the discharge end 17 of the chute where they roll into the compartment 51 of the receptacle 18, which at the time is aligned under the end 17 of the chute, five in each compartment. It will be apparent that as the roller pin 90 carried by the rotating arm 37 moves into engagement and passes the free end of the pivotal lever 92 to which is pivotally fixed the pawl 96 engaging at its lower end with the ratchet wheel 64 which carries the cam member 67, the pawl will move downwardly as indicated by the arrow (Fig. 1) and the ratchet wheel will be rotated counterclockwise a distance equal to one ratchet tooth, the movement of the lever 92 carried by the revolving roller pin 90 being sufficient to provide for this movement of the ratchet wheel.

As shown in the drawings the upper compartment 51 of the receptacle 18 (Fig. 2) has had five of the articles 12 stacked therein, the receptacle having been subsequently indexed in the direction of the arrow (Fig. 2) to position the next compartment 51 under the discharge end 17 of the chute 13 and one of the five articles to be stacked therein has been received and is at the bottom of the compartment. Beginning at this point in the operation of the apparatus to successively stack five of the articles 12 in each compartment 51, the arm 37 as it passes under the receiving end 14 of the chute 13 during each revolution will receive in the pocket 38 an article 12 which is removed therefrom by the deflecting portion 44 of the rail-like member 35, in the manner hereinbefore described, as the arm 37 continues to rotate. Shortly after each article 12 is removed from the pocket 38 and has rolled from the end 17 of the chute 13 and into the compartment 51 of the receptacle 18 the roller pin 90 actuates the lever 92 and pawl 96 and thereby rotates the ratchet wheel 64 a distance of one tooth and the cam member 67 a corresponding amount.

The cam surfaces 71 and 72 formed in the cam groove 68 of the member 67 are so spaced relative to the teeth of the ratchet wheel 64 that when the fifth article 12 has been delivered in the second compartment 51 from the upper end of the receptacle, as viewed in Fig. 2, the roller pin 90 when it next engages the lever 92 will index the ratchet wheel one tooth and during this movement the cam surface 71 will be in such a position that it will actuate the roller 73 carried by the lever 74 and rock the latter in a clockwise direction, as viewed in Fig. 2, about its pivot 75. Thus the spring pressed pawl 80 mounted in the lever 74, due to its engagement with the rack provided by the vertical edges of the channel plates 52, will move the receptacle 18 upon the rails 53 and 54 a distance sufficient to position the next compartment 51 thereof under the discharge end 17 of the chute 13. During the following indexing movement of the ratchet wheel 64 when the arm 37 delivers the first of the five articles to be stacked in the compartment 52 last moved into position under the end 17 of the chute, the pawl 80 will be rocked back again to the position shown in Fig. 2 in operative association with the next compartment to be moved into position due to the shape of the cam surface 71. As the pawl 80 moves back as just described the locking pawl 85 in a well known manner holds the receptacle in its advanced position.

When five articles are stacked in the last indexed compartment the cam surface 72 has been rotated into position to actuate the pawl 80 in the same manner as the cam surface 71, the arm 37 continuing to transfer articles and the cam surfaces 71 and 72 alternately serving to actuate the pawl 80 to index one compartment after another as they are stacked with five articles until all the compartments 51 of the receptacle are filled. The receptacle 18 which has been filled with the articles 12 in a predetermined order may then be removed from the apparatus by the operator sliding it off the rails 53 and 54 in the same direction it was moved during the automatic indexing of the compartments 51 thereof under the end 17 of the chute and an empty receptacle mounted in position by sliding it onto the rails 53 and 54 from the forward end thereof as viewed in Figs. 1 and 2 and after aligning the first compartment 51 with the end 17 of the chute the operation is repeated as before described.

The rails 52 and 54 are preferably slightly inclined in the direction of the movement of the receptacle so that after an indexing movement thereof there will be no likelihood of the receptacle, due to vibration, to move away from the locking pawl 85, but on the contrary it will be held by gravity against the pawl.

As hereinbefore described the discharge end 17 of the chute 13 is open, it having no top wall. This is for the purpose of taking care of an overflow of the articles in case the receptacle 18 after being filled with articles is not removed and replaced with an empty one by the operator and the articles continue to be delivered to the discharge end. In this case the excess articles will merely roll out of the end 17 in a horizontal direction into an overflow receptacle (not shown), thereby preventing an accumulation of the articles in the chute 13 with the likelihood of causing damage to the article handling and assembling apparatus or the automatic machine to which it is attached.

It will be understood that the embodiment herein described is merely illustrative of the invention, which is limited only by the terms of the appended claims.

What is claimed is:

1. In an article handling and assembling apparatus, stationary and movable elements cooperating to provide means for receiving an article at a predetermined point, transferring and directing it to a predetermined discharge point, said movable element operable through an opening in the stationary element along a portion thereof intermediate the receiving and discharge points, a movable receptacle adjacent the latter point having a plurality of compartments each adapted to receive a predetermined number of articles, and means operatively associated with the movable element and the receptacle responsive after the transfer of a predetermined number of articles corresponding to the number of articles received by a compartment for moving the receptacle to present an empty compartment thereof to the discharge point for the reception of a similar number of articles.

2. In an article handling and assembling apparatus, stationary and rotatable elements cooperating to provide means for receiving an article at a predetermined point during each rotation of the rotatable element, said movable element operable through an opening in the stationary element along a portion thereof intermediate the receiving and discharge points, transferring and directing it to a predetermined discharge point, a movable receptacle adjacent the latter point having a plurality of compartments each adapted to receive a predetermined number of articles, and means operatively associated with the rotatable element and the movable receptacle responsive after the transfer of a predetermined number of articles corresponding to the number of articles received by the compartment for moving the receptacle to present an empty compartment thereof to the discharge point for the reception of a similar number of articles.

3. In an article handling and assembling apparatus, stationary and movable elements cooperating to provide means for receiving an article at a predetermined point, transferring and directing it to a predetermined discharge point, a receptacle adjacent the latter point having a plurality of vertically disposed compartments each adapted to receive a predetermined number of articles in stacked relation, means for supporting the receptacle for horizontal movement, and means operatively associated with the movable element and the receptacle responsive after the transfer of a predetermined number of articles corresponding to the number of articles stacked in a compartment for moving the receptacle upon its support to present an empty compartment thereof to the discharge point for the reception of a similar number of articles.

4. In an article handling and assembling apparatus, stationary and movable elements cooperating to provide means for receiving an article at a predetermined point, transferring and directing it to a predetermined discharge point, a movable receptacle adjacent the latter point having a plurality of compartments each adapted to receive a predetermined number of articles, a pawl and ratchet mechanism actuated by the movement of the element, and means operatively connecting the pawl and ratchet mechanism with the receptacle responsive after a predetermined number of actuations of the pawl and ratchet mechanism corresponding to the number of articles received by a compartment for moving the receptacle to present an empty compartment thereof to the discharge point for the reception of a similar number of articles.

5. In an article handling and assembling apparatus, stationary and movable elements cooperating to provide means for receiving an article at a predetermined point, transferring and directing it to a predetermined discharge point, a movable receptacle adjacent the latter point having a plurality of compartments each adapted to receive a predetermined number of articles in abutting predetermined relation, means operatively connecting the movable element and the receptacle including a rack carried by the receptacle and a pawl engaging therewith operatively connected to the movable element responsive after the transfer of a predetermined number of articles corresponding to the number of articles received by a compartment for moving the receptacle to present an empty compartment thereof to the discharge point for the reception of a similar number of articles.

6. In an article handling and assembling apparatus for attachment to an article working machine, an arcuate chute for receiving articles at predetermined intervals from the machine, an article carrier associated with the chute operable in timed relation with the reception of an article in the chute for receiving and transferring the article from the receiving end of the chute to the discharge end thereof, a movable receptacle adjacent the discharge end of the chute having a plurality of compartments each adapted to receive a predetermined number of articles, and means operatively associated with the carrier and the receptacle responsive after the transfer of a predetermined number of articles corresponding to the number of articles received by a compartment for moving the receptacle to present an empty compartment thereof to the discharge end of the chute for the reception of a similar number of articles.

7. In an article handling and assembling apparatus, a chute having a portion of its side and bottom walls removed intermediate its receiving and discharge ends, a movable article carrier provided with a pocket in its periphery passing in and out of the chute through the removed portion thereof and operable in timed relation with the reception of an article in the receiving end of the chute for pocketing the article and transferring it to the discharge end of the chute, a movable receptacle adjacent the latter end of the chute having a plurality of compartments, each adapted to receive a predetermined number of articles, and means operatively associated with the movable carrier and receptacle responsive after the transfer of a predetermined number of articles corresponding to the number of articles received by a compartment for moving the receptacle to present an empty compartment thereof to the discharge end of the chute for the reception of a similar number of articles.

8. In an article handling apparatus for attachment to an article working machine designed to discharge articles at predetermined intervals, a chute for receiving articles discharged from the machine, the receiving end of said chute being hinged and normally positioned close to the article discharge point of the machine, and an article carrier associated with the chute and operable in synchronism with the discharge of articles from the machine for receiving and transferring the article from the receiving end of the chute to the discharge end thereof.

9. In an article handling and assembling apparatus, a chute for receiving articles having an arcuate portion intermediate its receiving and discharge ends, a rotatable article carrier operable through an opening in the arcuate portion of the chute in timed relation with the reception of an article in the receiving end for transferring it to the discharge end, a movable receptacle adjacent the latter end of the chute having a plurality of compartments, each adapted to receive a predetermined number of articles, and means operatively associated with the rotatable carrier and receptacle responsive after the transfer of a predetermined number of articles corresponding to the number of articles received by a compartment for moving the receptacle to present an empty compartment thereof to the discharge end of the chute for the reception of a similar number of articles.

In witness whereof, I hereunto subscribe my name this 10th day of September, A. D. 1929.

JOHN S. STULL.